United States Patent
Persson et al.

(10) Patent No.: US 6,421,803 B1
(45) Date of Patent: Jul. 16, 2002

(54) SYSTEM AND METHOD FOR IMPLEMENTING HYBRID AUTOMATIC REPEAT REQUEST USING PARITY CHECK COMBINING

(75) Inventors: Joakim Persson; Leif Wilhelmsson, both of Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/411,025

(22) Filed: Oct. 4, 1999

Related U.S. Application Data (60) Provisional application No. 60/141,159, filed on Jun. 25, 1999.

(51) Int. Cl.$^7$ ............................................. H03M 13/00
(52) U.S. Cl. ..................... 714/752; 714/748; 714/751; 714/758; 714/776
(58) Field of Search ................................ 714/748, 749, 714/750, 751, 752, 758, 776, 786; 370/473, 216, 480

(56) References Cited

U.S. PATENT DOCUMENTS

| | | | | |
|---|---|---|---|---|
| 4,344,171 A | * | 8/1982 | Lin et al. ..................... | 714/751 |
| 4,975,952 A | * | 12/1990 | Mabey et al. ................ | 713/160 |
| 5,115,436 A | * | 5/1992 | McAuley ..................... | 714/781 |
| 5,638,384 A | | 6/1997 | Hayashi et al. .............. | 714/752 |
| 5,719,883 A | * | 2/1998 | Ayanoglu .................... | 714/751 |
| 6,126,310 A | * | 10/2000 | Osthoff et al. ............... | 714/751 |
| 6,141,784 A | * | 10/2000 | Davis et al. ................. | 714/748 |

FOREIGN PATENT DOCUMENTS

WO   PCT/EP00/05315   10/2000

OTHER PUBLICATIONS

A Variable-Redundancy Hybrid ARQ Scheme Using Invertible Convolutional Codes, by Ajay Dholakia, Mladen A. Vouk, and Donald L. Bitzer, Proceedings of the Vehicular Technology Conference, IEEE, vol. Conf. 44, Jun. 8, 1994, pp. 1417–1420, XP000497654.

* cited by examiner

*Primary Examiner*—Emmanuel L. Moise
(74) *Attorney, Agent, or Firm*—Jenkens & Gilchrist, P.C.

(57) ABSTRACT

A telecommunications system and method for performing error detection on received data packets and error correction on only those data packets that were received in error without the need for retransmission of the data packets or parity checking bits. At the transmitter, the complete data packet is divided into a number of data units (DUs). The DUs are encoded for both error detection and error correction. Both the error correction and error detection parity check bits are separately combined into one or more blocks. Thereafter, the DUs and the block(s) containing the combined parity check bits are transmitted to the receiver. If the receiver determines that a received DU does not contain any errors, the error correction parity check bits for that DU are generated and their effect on the combined error correction parity check bits removed. Thereafter, the remaining error correction parity check bits, which now only contains information about the DUs actually in error, are used to correct the erroneous DUs.

27 Claims, 5 Drawing Sheets

SYSTEM AND METHOD FOR IMPLEMENTING HYBRID AUTOMATIC REPEAT REQUEST USING PARITY CHECK COMBINING

This application claims the priority under 35 U.S.C. 119(e)(1) of U.S. provisional application No. 60/141,159, filed on Jun. 25, 1999.

BACKGROUND OF THE PRESENT INVENTION

1. Field of the Invention

The present invention relates generally to telecommunications systems and methods for reliable transmission of information, and specifically to error control coding to ensure the reliability of transmitted information.

2. Background and Objects of the Present Invention

There are many applications where large volumes of digital data must be transmitted and received in a substantially error free manner. In cellular telecommunications and satellite communications systems, in particular, it is imperative that the transmission of digital data over the air interface be completed in as accurate a manner as is possible. Accurate transmission and reception of digital data has, however, been difficult because the communications channels utilized for data transmissions over the air interface are plagued by error introducing factors. For example, such errors may be attributable to transient conditions in the channel, such as noise and distortion, or they may be due to recurrent conditions attributable to defects in the channel. The existence of transient conditions or defects results in instances where the digital data is not transmitted properly or cannot be reliably received.

Digital data is often transmitted in packets (or blocks or frames), in which each packet includes a number of information bytes followed by a frame check sequence of parity check bits (PCBs). The errors that typically occur in the transmission and reception of digital data are of two types: "random" channel errors and "burst" channel errors. Random channel errors are errors that occur independent of one another and are uniformly spread in a packet, while burst channel errors are errors that occur in clusters. The PCBs in each data packet are used to detect when and where a channel error has been introduced into the data packet.

Considerable attention has been directed towards discovering methods for addressing the problems concerning errors which typically accompany data transmission activities over the air interface. For example, two common techniques of error correction include Forward Error Correction (FEC) and Automatic Repeat Request (ARQ). The FEC error correction technique adds redundant information in the transmitter, which is used by the receiver to correct transmission errors, whereas in the (ARQ) error correction technique, the data is encoded in such a way that errors in the data packet can be detected, but not corrected. With ARQ, when errors are detected, the receiver requests retransmission of those erroneously received data packets.

One common way of detecting errors is to include error detecting PCBs, such as a Cyclic Redundancy Check (CRC) code, with the data packet. The CRC code is generated from the information included in the data packet. At the receiver, the receiver uses the information included in the received data packet to generate an additional CRC code. If the CRC code generated by the receiver matches the CRC code included with the received data packet, the data packet is accepted as correctly received. If not, the receiver requests retransmission of that data packet. It should be understood that the error could be with the data packet or with the CRC code itself. However, since the CRC code and data packet are considered one unit, an error to either is considered an error to the whole unit.

If the bit error rate (BER) on the communications channel is relatively small, the ARQ technique will give a high throughput for feasible packet lengths. However, if the BER is increased, the throughout will be heavily reduced due to the increased number of retransmissions needed. Therefore, typically, a combination of FEC and ARQ techniques are applied in order to have a reliable link without sacrificing too much in average through-put. This combination of ARQ and FEC is referred to as Hybrid ARQ.

For example, in order to improve the performance for the ARQ technique when the BER is high, Hybrid ARQ type-I techniques can be used. In a Hybrid ARQ type-I technique, the data is encoded such that in addition to error detection, correction of the most likely errors can be performed at the receiver. Only the most likely errors, e.g., error patterns with only a few bits in error, are corrected at the receiver, which reduces the number of retransmissions. The rare error patterns are detected, and retransmission of those data packets with rare errors is requested. Therefore, the effective data rate of the packet can be kept relatively high. Hybrid ARQ type-I techniques are best suited for channels where the BER is relatively constant.

However, there are many practical cases where the BER is not constant, but rather varies considerably. The reasons for this variance in BER can include, for instance, an interferer present during a part of the packet, but not during another part of the packet. The effect of this variance can be either a good channel, such that no error correction is needed, or an extremely bad channel, such that a very powerful code (implying low rate) would be needed. Hybrid ARQ type-I techniques do not perform well when the channel is good, because the error correcting capability is not needed. In addition, when the channel is extremely bad, which implies that excessive rare error patterns might be present, the error correcting capability of the Hybrid ARQ type-I technique might not be sufficient.

In these cases of BER variance, a Hybrid ARQ type-II technique can be employed. The Hybrid ARQ type-II technique adapts the ARQ technique to the actual channel conditions. First, a data packet is sent with a block of PCBs for error detection only. If no errors are detected by the receiver, the packet is considered correctly received. If, however, errors are detected, the received packet is buffered, and the receiver requests the transmitter to transmit another block of PCBs, which can be used, together with the previously received block of PCBS, to perform error correction. Thus, error correction is only performed when it is actually needed. However, as with the conventional ARQ technique, the ARQ type-II technique introduces additional delay due to the retransmission of the PCBs.

It is, therefore, an object of the present invention to provide for both error detection and error correction of data packets without the need for retransmission of the data packet or parity check bits associated with the data packet.

It is a further object of the present invention to provide error correction only for those data packets received incorrectly.

SUMMARY OF THE INVENTION

The present invention is directed to telecommunications systems and methods for performing error detection on data packets at a receiver, and for performing error correction on only those data packets that were received in error, without the need for retransmission of the data packets or parity checking bits. The complete data packet to be transmitted is first divided into a number of blocks denoted data units (DUs). The DUs are encoded for both error detection and error correction. Subsequently, the error correction parity check bits for the DUs of the complete data packet are combined into one or more blocks, and likewise, the error detection parity check bits are preferably combined into one or more separate blocks. Thereafter, a transmitter transmits the DUs and the block(s) containing the combined parity check bits to the receiver. When the receiver decodes the DUs, the receiver checks for errors in each of the DUs. For each DU that does not contain any errors, the parity check bits for error correction for that DU are generated and their effect on the combined parity check bits for error correction removed. Thereafter, the parity check bits for error correction, which now only contains information about the DUs actually in error, are used in an attempt to correct the erroneous DUs. Thus, the parity check bits for error correction are only used for those DUs determined to have errors, and no error correcting capability is wasted on those DUs that have been correctly received.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The Open Systems Interconnection (OSI) model was developed in the early 1980's by the International Standards Organization (ISO) for use in mainframe environments. This protocol provides the procedures and mechanisms necessary for mainframe computers to communicate with other devices, including terminals and modems. The OSI model divides data transmission into three distinct functions (process, transport and network) to carry out an application, which can be, for example, a file transfer or a voice transmission. The process function uses protocols which are unique to the application that uses them, while the transport function interfaces with the process function to provide reliable data transmission over the network. For example, the transport function provides error detection and correction, as well as other tasks such as sequencing of segments of data. Finally, the network function provides the mechanisms for actually routing the data over the network to the destination node.

Figure 1:
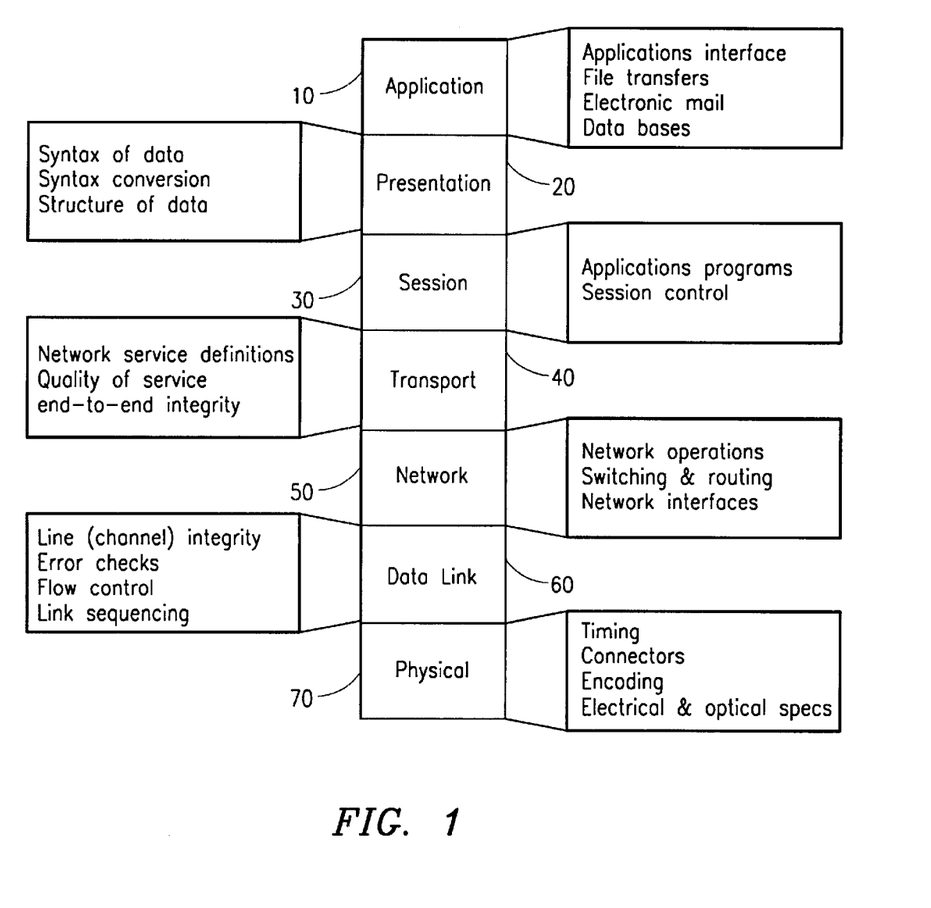
FIG. 1 is a block diagram illustrating the seven layers forming the Open Systems Interconnection model.

With reference now to FIG. 1 of the drawings, the Open Systems Interconnection (OSI) model addresses the process function, the transport function and the network function, and divides these functions into seven different layers: application 10, presentation 20, session 30, transport 40, network 50, data link 60 and a physical 70. Each layer provides a service to the layer above and below it. For example, the physical layer 70 provides a service to the data link layer 60, which, in turn, provides a service to the network layer 50 and the physical layer 70, and so on. However, each layer is independent, and therefore, should the function change at any one layer, it will not impact the function of the other layers.

The physical layer 70, which is the bottom layer, is the layer responsible for converting the digital data into a bit stream for transmission over the communications channel. The data link layer 60 provides reliable communications between two devices, such as a transmitter and a receiver. For example, with reference now to FIG. 2 of the drawings, when data 215 is to be transmitted from a transmitter 200 to a receiver 250 over an air interface 240, the network, layer 50a in the transmitter 200 passes a block of data 215 known as a service data unit (SDU) 210, which is typically composed of several data packets, to the data link layer 60a in the transmitter 200. The data link layer 60a in the transmitter 200 segments the SDU 210 into multiple data units (DUs) 220, which have a predefined short length, e.g., 40 bytes, as compared to the length of the SDUs 210, e.g., 1500 bytes. These DUs 220 are stored in a transmit buffer 230 in the data link layer 60a, and passed to the physical layer 70a in the transmitter 200 for conversion of the digital data 215 in the DUs 220 into a bit stream for transmission over the communications channel 240, such as an air interface, to the physical layer 70b in the receiver 250.

Figure 2:
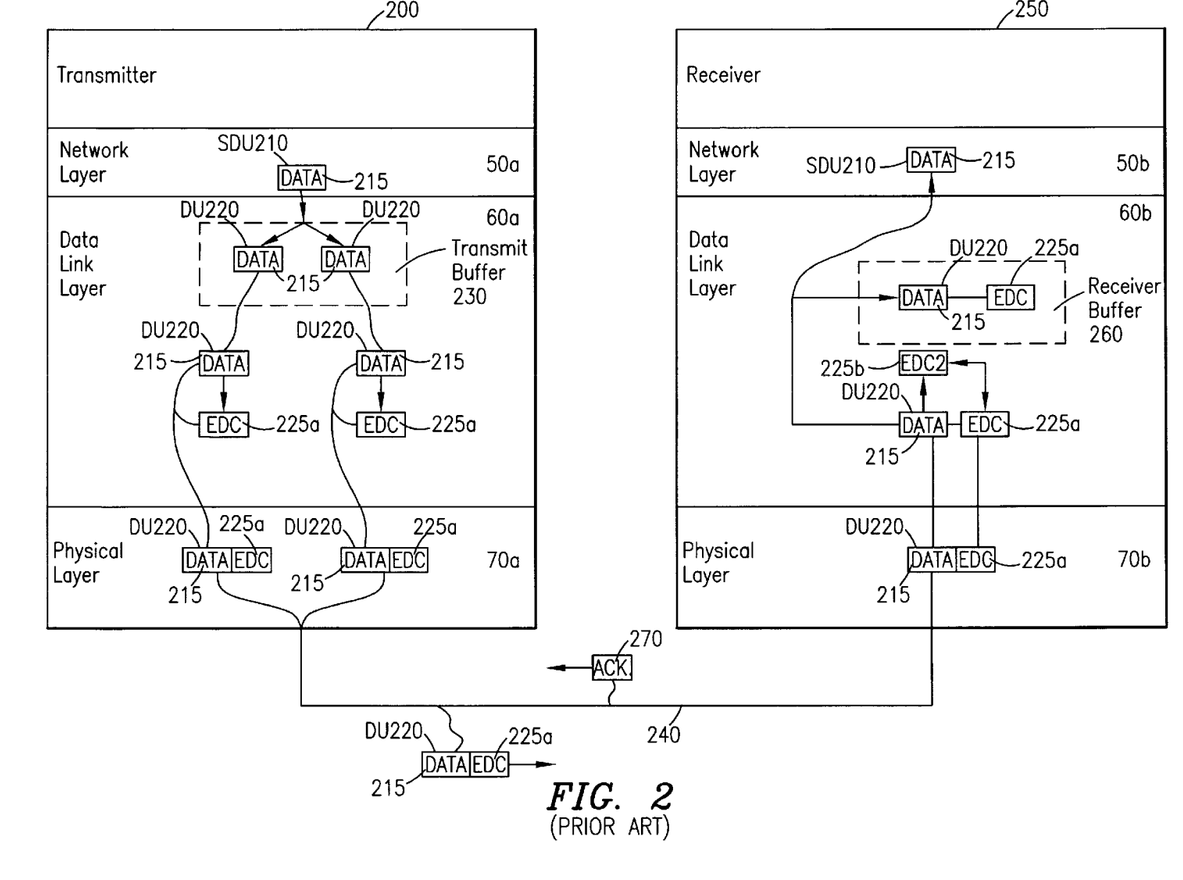
FIG. 2 is a block diagram illustrating the transmission of data packets from a transmitter to a receiver over the air interface using an Automatic Repeat Request (ARQ) error detecting technique.

When the physical layer 70a of the transmitter 200 transmits the DUs 220 containing the data 215 over the communications channel 240 to the receiver 250, the communications channel 240 between the transmitter 200 and receiver 250 used to transmit the data 215 may introduce a number of errors into the transmitted data 215. Therefore, in addition to transmitting the DU's 220, an error detecting code 225a, such as a Cyclic Redundancy Checking (CRC) code containing parity check bits (PCBs), can be transmitted for each DU 220. This type of error detecting technique is known as the Automatic Repeat Request (ARQ) technique. The CRC code 225a for each DU 220 is generated by the transmitter 200 based upon the data 215 within the respective DU 220. Thus, each CRC code 225a is derived from the data 215 within the DU 220 that it is associated with.

When the data link layer 60b of the receiver 250 receives the DUs 220 from the physical layer 70b of the receiver 250, the data link layer 60 of the receiver 250 generates additional CRC codes 225b for each of the received DUs 220 based upon the data 215 contained in each of the received DUs

220. The CRC codes 225b are used to detect which DUs 220 are in error. The data link layer 60b of the receiver 250 stores those DUs 220 in error and all DUs 220 associated with the SDU 210 having the DUs 220 in error in a receiver buffer 260. Thereafter, the data link layer 60b of the receiver 250 requests retransmission by the data link layer 60a of the transmitter 200 of those DUs 220 not correctly received by the receiver 250. If, and when, a DU 220 is correctly received, the data link layer 60b of the receiver 250 transmits an acknowledgment message 270 to the data link layer 60a of the transmitter 200, informing the transmitter 200 that the DU 220 was correctly received. In addition, when all of the DUs 220 associated with the SDU 210 are received correctly, the SDU 210 is transmitted to the network layer 50b of the receiver 250.

This type of ARQ technique is simple but inherently inefficient because of the idle time spent waiting for an acknowledgment 270 of each transmitted DU 220. Thus, although the reliability of the ARQ technique is high, in that the probability of the receiver 250 accepting an incorrect DU 220 is low, the throughput efficiency is low due to the number of retransmissions needed.

Figure 3:
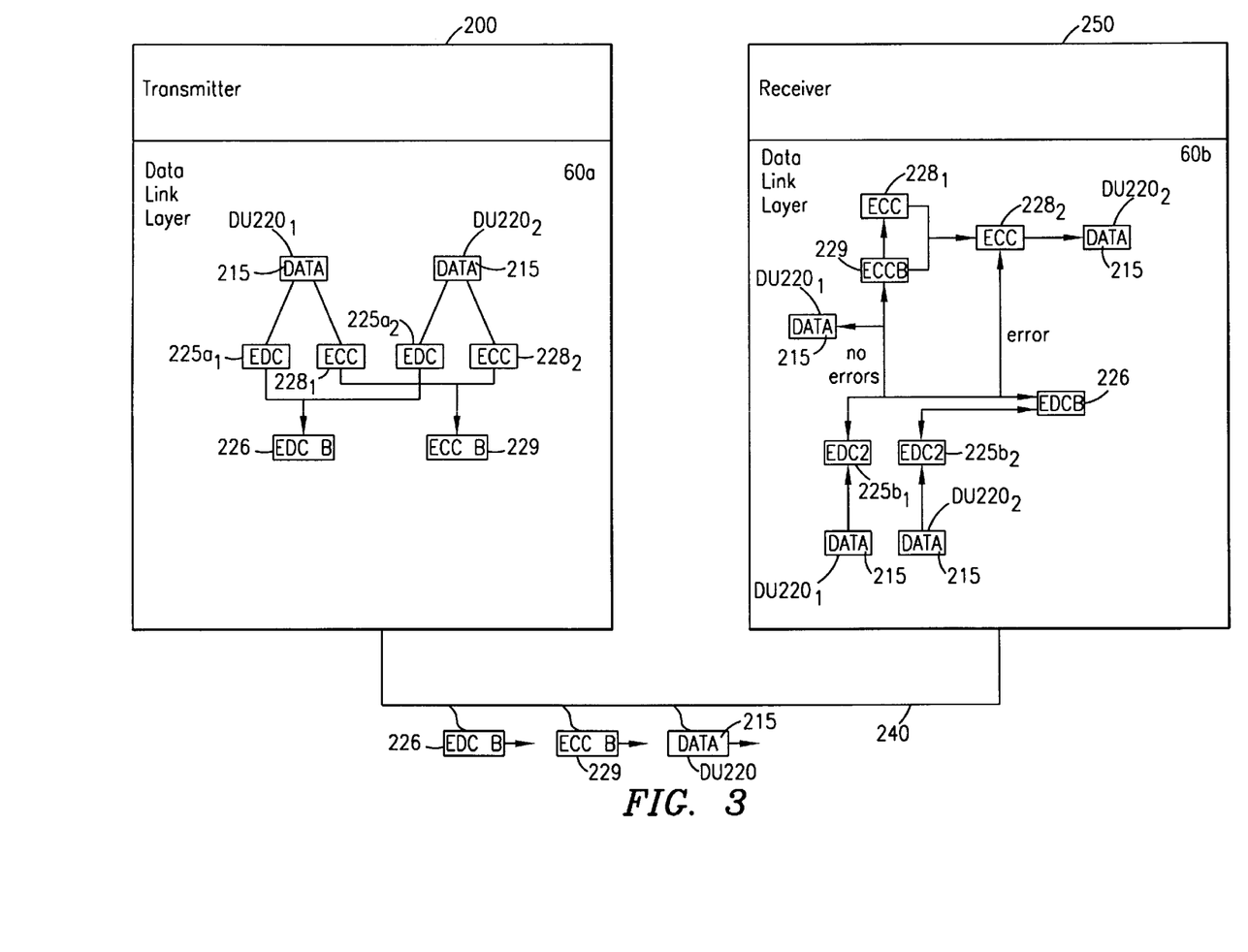
FIG. 3 illustrates the transmission of data packets using a Hybrid ARQ technique that utilizes both error detection and error correction in accordance with preferred embodiments of the present invention.
Figure 4:
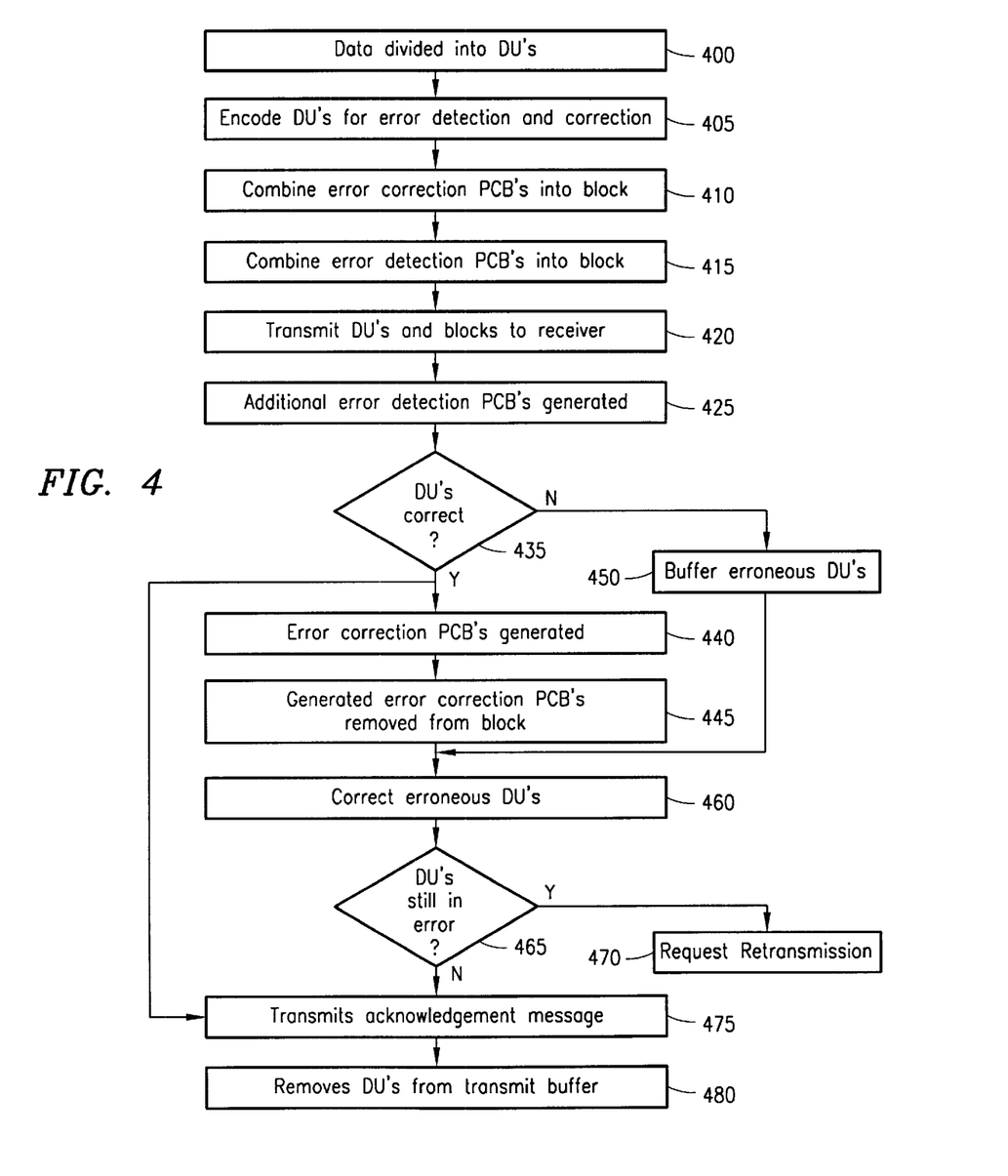
FIG. 4 illustrates the steps for transmitting data packets utilizing the Hybrid ARQ technique shown in FIG. 3 of the drawings.

Therefore, in accordance with embodiments of the present invention, a Hybrid ARQ technique can be employed such that error correction can be performed for only those DUs 220 received in error, without the need for retransmission of the DUs 220 in error. With reference now to FIG. 3 of the drawings, which will be described in connection with the steps listed in FIG. 4 of the drawings, once the data 215 to be transmitted to the receiver 250 is divided into a number of DUs $220_1$ and $220_2$ by the data link layer 60a of the transmitter 200 (step 400), the DUs $220_1$ and $220_2$ are individually encoded for both error detection and error correction (step 405). Thereafter, error correction PCBs $228_1$ and $228_2$ for the DUs $220_1$ and $220_2$, respectively, are combined into one or several blocks 229 (step 410). Likewise, in preferred embodiments, error detection PCBs $225a_1$ and $225a_2$, such as CRC bits, are combined into one or several blocks 226 (step 415). Alternatively, instead of combining the error detection PCBs $225a_1$ and $225a_2$, the error detection PCBs $225a_1$ and $225a_2$ can be transmitted with the DUs $220_1$ and $220_2$ that they appertain to.

Once the transmitter transmits the DUs 220 and the block(s) 229 and 226 containing the combined error correction and error detection PCBs, respectively, over the communications channel 240, such as the air interface, to the data link layer 60b of the receiver 250 (step 420), the received DUs 220 and 2202 are used to generate additional error detection PCBs $225b_1$ and $225b_2$, respectively, for each of the received DUs $220_1$ and $220_2$ (step 425). Thereafter, the additional error detection PCBs $225b_1$ and $225b_2$ and the received error detection PCB block 226 are used to determine if there are any erroneous DUs 220 (step 435). For example, as shown in FIG. 3, since DU $220_1$ is determined not to be in error (step 435), the error correction PCBs $228_1$ for those DUs 220 are generated (step 440). Since these error correction PCBs $228_1$ are known, their influence on the combined error correction block(s) 229 is known and can be removed (step 445).

However, if any one of the DUs, here DU $220_2$, is found to be in error (step 435), the erroneously received DU $220_2$ is buffered in the receiver buffer 260 (shown in FIG. 2) (step 450), and the erroneously received DU $220_2$, together with the remaining error correction PCBs $228_2$, which are dependent only upon the erroneous DUs 220, are used to correct the erroneously received DU $220_2$ (step 460). If, after error correction, the erroneously received DU $220_2$ is still found to be in error (step 465), which would not normally be the case, the receiver 250 requests retransmission of the erroneously received DU $220_2$ (step 470). For all DUs $220_1$ and $220_2$ received correctly (step 435) or corrected by error correction (step 465), the receiver 250 transmits an acknowledgment message 270 to the transmitter 200 (step 475), which in turn, removes each of these DUs $220_1$ and $220_2$ from the transmit buffer 230 (shown in FIG. 2) (step 480).

In effect, this Hybrid ARQ technique allows all of the error correcting capability obtained through the combined error correcting PCB block 229 to be used for correcting the DUs 220 found in error, while no error correcting capability is wasted on those DUs 220 that were correctly received. Thus, the overhead decreases without increasing the number of retransmissions.

Figure 5:
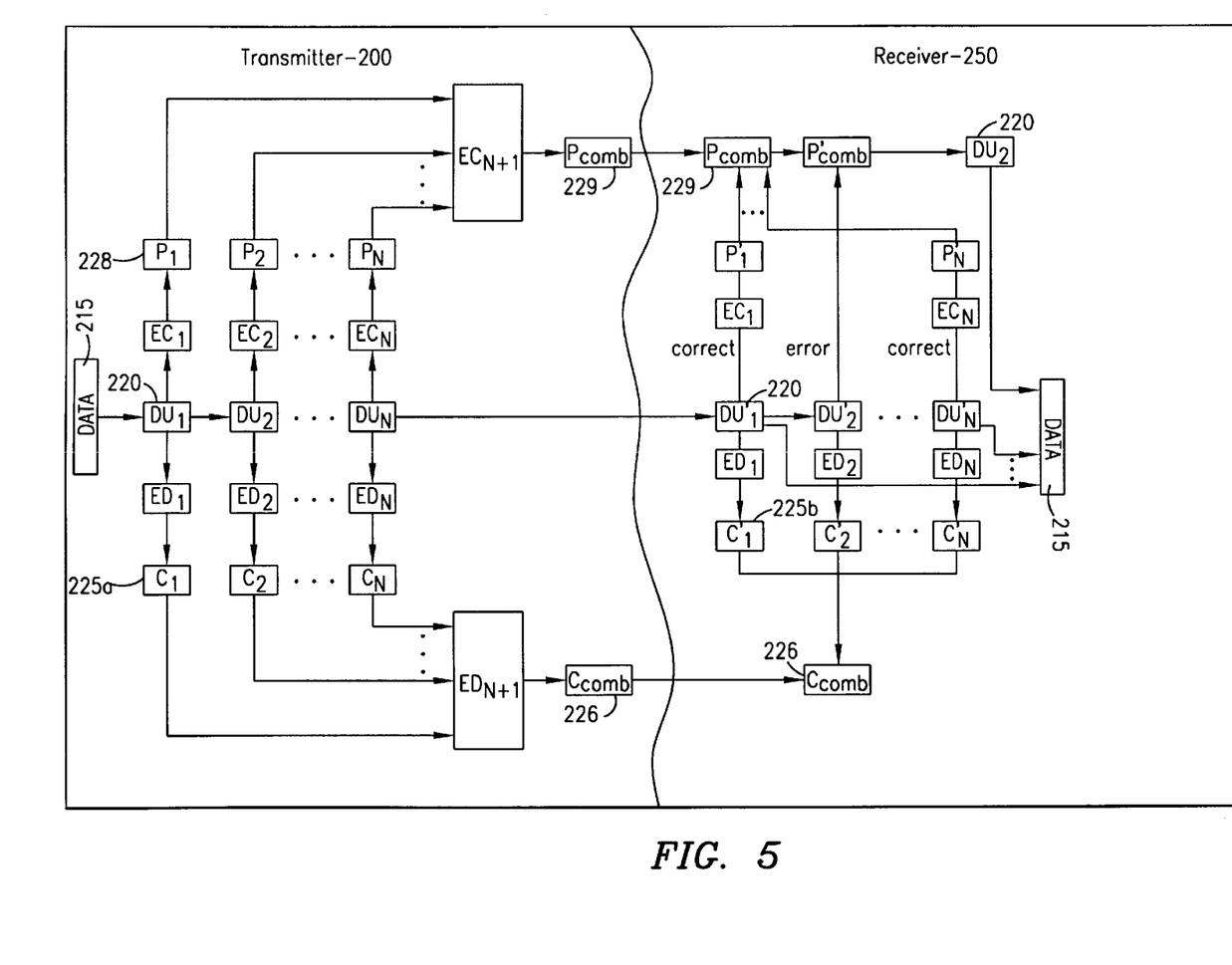
FIG. 5 illustrates the generation of combined parity check bits for both error detection and error correction for a plurality of data units.

Embodiments of the present invention will now be more fully described in connection with FIG. 5 of the drawings. Starting with K bits of data 215, this data 215 is first divided into N blocks, containing $n_1, n_2, \ldots n_N$ bits, respectively. These blocks correspond to the DUs 220 shown in FIG. 3 and are denoted $DU_1 \ldots DU_N$.

Each of these DUs 220 is first encoded for error detection, for instance, by adding CRC bits 225a. The N codes used for generating the error detection PCBs are denoted $ED_1$, $ED_2$, etc. The PCBs 225a used for error detection for each DU 220 are denoted $C_1, C_2, \ldots, C_N$, respectively. Next, each one of these DUs 220 is encoded for error correction, such that redundancy PCBs 228 are added for each one of the DUs 220. The N codes used for error correction are denoted $EC_1$, $EC_2$, etc. The PCBs 228 for error correction for each of the different DUs 220 are denoted $P_1, P_2, \ldots, P_N$, respectively.

Thereafter, the PCBs 228 for error correction for all of the DUs 220 are encoded into an error correction block 229, hereinafter denoted, $P_{comb}$, using the code $EC_{N+1}$. For example, the code $EC_{N+1}$ can add all of the error correction PCBs 228 bitwise modulo-2 (assuming the PCBs 228 to have the same length), to form $P_{comb}$. As an alternative, the code $EC_{N+1}$ can be a Reed-Solomon code, which facilitates better error correcting capability as compared with the modulo-2 sum method. In addition, a trellis code, block code or convolutional code can be used for the code $EC_{N+1}$. It should be understood that the code $EC_{N+1}$ can both combine the error correction PCBs 228, and generate additional error detection PCBs (not shown) for the combined error correction PCBs 228. Therefore, the receiver 250 can ensure that the combined PCBs 228 for error correction are received correctly.

In addition, in preferred embodiments, the CRC bits 225a for all of the DUs 220 are encoded (combined) into a block 226, hereinafter denoted $C_{comb}$, using the code $EDN_{N+1}$, which can be, for example, a Reed-Solomon code. Alternatively, instead of combining the CRC bits 225a, all of the CRC bits 225a can be sent unaffected with the DUs 220 they appertain to, or the CRC bits 225a can be put together into one packet.

Thereafter, the N DUs 220 as well as the $C_{comb}$ bits used for error detection and the $P_{comb}$ bits used for error correction are transmitted to the receiver 250. At the receiver 250, upon reception of the N DUs 220, denoted $DU'_1, DU'_2, \ldots, DU'_N$, the $C_{comb}$ bits for error detection are used to determine which ones, if any, of the DUs 220 are in error. This is accomplished by generating, for each of the DUs 220, the corresponding CRC bits 225b, $C'_1 \ldots C'_N$. These additional CRC bits 225b, in addition to the $C_{comb}$ bits, are used for error detection.

For example, if $DU'_1$ is the DU 220 received at the receiver 250 that corresponds to transmitted $DU_1$, the receiver 250 computes CRC bits $C'_1$ based upon $DU'_1$. The receiver repeats this process for each DU 220, $DU_1 \ldots DU_N$, to produce CRC bits 225b, $C'_1 \ldots C'_N$. These CRC bits 225b, $C'_1 \ldots C'_N$, together with the received $C_{comb}$, are used to determine which, if any, DUs 220 were received in error.

For all correctly received DUs 220, the corresponding PCBs 228 for error correction, $P'_1 \ldots P'_N$, are generated, and their influence on the $P_{comb}$ bits removed. Therefore, the remaining part of $P_{comb}$, shown as block $P'_{comb}$ entirely depends upon the DUs 220 not correctly received. For example, assuming that all DUs 220 except one, such as $DU_2$, were correctly received as determined by the error detection step above, and also assuming that $P_{comb}$ was correctly received, if $P_{comb}$ is the modulo-2 sum of all of the PCBs 228 for error correction for the different DUs 220, the PCBs 228 for the erroneous DU 220, here $DU_2$, can simply be obtained by adding modulo-2 the sum of $P_{comb}$ with all of the PCBs 228 for error correction generated by the receiver 250 for the correctly received DUs 220. It should be understood that the method of using modulo-2 sums only works if at most one DU 220 is in error. More complex methods are needed if it is anticipated that more than one erroneous DU 220 will occur.

Finally, the generated $P'_{comb}$ for error correction for the erroneous DUs 220 can be used to correct errors in those DUs 220. If, after error correction, one or more of the DUs 220 is still not correct, a retransmission of those DUs 220 is requested. The process of determining whether or not the DUs 220 subjected to the correction process were actually corrected is similar to the error detection process described above. For example, if $DU_2$ was not correctly received, in an attempt to correct $DU_2$, the receiver 250 would apply the error correction PCBs, $P_2$, to produce $DU'_2$. Thereafter, the CRC bits 225b, $C'_2$, are generated by the receiver 250 based upon the estimated $DU'_2$, and $DU'_2$ is now checked in the same way as before the correction took place. If $DU_2$ is still considered not correctly received, retransmission would be requested by the receiver 250. It should be noted that it is not necessary to retransmit all of the DUs 220 that were not received correctly, but only so many of those DUs 220 that error correction becomes possible at the receiver 250.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for detecting and correcting errors in transmitted data, comprising:
   a transmitter for receiving a block of data, segmenting said block of data into at least two data units, generating error detection codes and error correction codes for each of said at least two data units and combining all of said error correction codes into an error correction block; and
   a receiver for receiving said at least two data units, said error detection codes and said error correction block from said transmitter, determining whether any of said at least two received data units is in error using said associated error detection codes, removing said error correction codes associated with each of said at least two data units that are received correctly from said error correction block and correcting each of said at least two data units that are received in error using said associated error correction codes generated from a remainder of said error correction block.

2. The telecommunications system of claim 1, further comprising:
   a channel for transmitting said at least two data units, said error detection codes and said error correction block from said transmitter to said receiver.

3. The telecommunications system of claim 2, wherein said channel is an air interface.

4. The telecommunications system of claim 1, wherein said transmitter further combines said error detection codes into an error detection block, said receiver using said error detection block to determine whether any of said at least two received data units is in error.

5. The telecommunications system of claim 4, wherein said receiver generates additional error detection codes using said at least two received data units, said receiver using said additional error detection codes along with said error detection block to determine whether any of said at least two received data units is in error.

6. The telecommunications system of claim 1, wherein said transmitter further comprises:
   a network layer for generating said block of data;
   a data link layer for receiving said block of data from said network layer, segmenting said block of data into said at least two data units and generating said error detection codes and said error correction block; and
   a physical layer for transmitting said at least two data units, said error detection codes and said error correction block to said receiver.

7. The telecommunications system of claim 6, wherein said receiver further comprises:
   a physical layer for receiving said at least two data units, said error detection codes and said error correction block from said transmitter; and
   a data link layer for determining whether any of said at least two received data units is in error and correcting each of said at least two data units that are received in error using said associated error correction codes generated from said remainder of said error correction block.

8. The telecommunications system of claim 1, wherein said receiver transmits an acknowledgment message to said transmitter for each of said at least two data units that are received correctly or are corrected using said associated error correction codes generated from said remainder of said error correction block.

9. The telecommunications system of claim 8, wherein said transmitter further comprises:
   a transmit buffer for storing said at least two data units until said acknowledgment message for each of said at least two data units is received.

10. The telecommunications system of claim 1, wherein said receiver further comprises:
   a receiver buffer for storing each of said at least two data units received in error until each of said at least two data units received in error is corrected.

11. The telecommunications system of claim 10, wherein said receiver requests retransmission from said transmitter of said error correction codes for each of said at least two data units that cannot be corrected.

12. The telecommunications system of claim 1, wherein said error correction block is generated by adding all of said error correction codes together bitwise modulo-2.

13. The telecommunications system of claim 1, wherein said error detection codes comprise Cyclic Redundancy Check bits.

14. The telecommunications system of claim 1, wherein said error correction codes comprise parity checking bits.

15. The telecommunications system of claim 1, wherein said error correction block consists of at least two error correction blocks.

16. A method for transmitting data from a transmitter to a receiver without the need for retransmission of said data, comprising the steps of:

receiving, at said transmitter, a block of data;

segmenting said block of data into at least two data units;

generating an error detection code for each of said at least two data units;

generating an error correction code for each of said at least two data units;

combining all of said error correction codes to form an error correction block; and transmitting said at least two data units, said error detection codes and said error correction block.

17. The method of claim 16, further comprising the step of:

combining said error detection codes into an error detection block, said error detection block being transmitted.

18. The method of claim 16, wherein said step of transmitting further comprises the steps of:

storing said at least two data units within a transmit buffer within said transmitter;

removing said at least two data units from said transmit buffer when an acknowledgment message for each of said at least two data units is received.

19. The method of claim 16, wherein said step of combining further comprises the step of:

combining said error correction codes into said error correction block by adding all of said error correction codes together bitwise modulo-2.

20. A method for detecting and correcting errors in data transmitted from a transmitter to a receiver, comprising the steps of:

receiving, at the receiver, at least two data units, an error detection code for each of said at least two data units and an error correction block containing a combination of error correction codes for each of said at least two data units;

determining whether any of said at least two received data units is in error using said associated error detection codes;

removing said error correction codes associated with each of said at least two data units that are received correctly from said error correction block; and correcting each of said at least two data units that are received in error using said associated error correction codes generated from a remainder of said error correction block.

21. The method of claim 20, wherein said step of receiving further comprises the step of:

receiving an error detection block containing a combination of said error detection codes; and using said error detection block to determine whether any of said at least two received data units is in error.

22. The method of claim 21, wherein said step of determining further comprises the step of:

generating second error detection codes for each of said at least two received data units using said at least two received data units; and using said second error detection codes along with said received error detection block to determine if any of said at least two data units is in error.

23. The method of claim 20, wherein said step of correcting further comprises the steps of:

generating said error correction codes for said at least two data units received in error using said remainder of said error correction block; and applying said generated error correction codes to said at least two data units received in error to correct said at least two data units received in error.

24. The method of claim 20, further comprising the step of:

transmitting an acknowledgment message to said transmitter for each of said at least two data units that are received correctly or are corrected using said associated error correction codes generated from said remainder of said error correction block.

25. The method of claim 20, further comprising the step of:

storing each of said at least two data units received in error in a receiver buffer until each of said at least two data units received in error is corrected.

26. The method of claim 20, further comprising the step of:

requesting retransmission from said transmitter of said error correction codes for each of said at least two data units that cannot be corrected.

27. The method of claim 20, wherein said step of removing further comprises the step of:

generating said error correction codes for each of said at least two data units that are received correctly.

\* \* \* \* \*

UNITED STATES PATENT AND TRADEMARK OFFICE
CERTIFICATE OF CORRECTION

PATENT NO. : 6,421,803 B1
DATED : July 16, 2002
INVENTOR(S) : Joakim Persson et al.

It is certified that error appears in the above-identified patent and that said Letters Patent is hereby corrected as shown below:

Title page,
Item [57], ABSTRACT,
Line 1, replace "method for performing" with -- method is disclosed for performing --

Column 2,
Line 51, replace "PBCS" with -- PBCs --

Column 4,
Line 33, replace "the network, layer" with -- the network layer --

Column 5,
Line 47, replace "220 and 2202" with -- $220_1$ and $220_2$ --

Signed and Sealed this

Twenty-sixth Day of November, 2002

Attest:

Attesting Officer

JAMES E. ROGAN
Director of the United States Patent and Trademark Office